(12) United States Patent
Wang et al.

(10) Patent No.: US 7,786,399 B2
(45) Date of Patent: Aug. 31, 2010

(54) APPARATUS COMPRISING A BUTTON FORMED WITH A PANEL AND FLAT PANEL DISPLAY

(75) Inventors: Te-Hsu Wang, MiaoLi (TW); Zhi-Yuan Cai, Shenzhen (CN); Jie-Feng He, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 925 days.

(21) Appl. No.: 11/641,485

(22) Filed: Dec. 18, 2006

(65) Prior Publication Data

US 2007/0139357 A1 Jun. 21, 2007

(30) Foreign Application Priority Data

Dec. 16, 2005 (TW) ............................... 94144801 A

(51) Int. Cl.
*H01H 13/70* (2006.01)
(52) U.S. Cl. ...................................... 200/345; 200/296
(58) Field of Classification Search ................. 200/345, 200/296
See application file for complete search history.

(56) References Cited

U.S. PATENT DOCUMENTS 6,914,203 B2 * 7/2005 Suzuki ........................ 200/6 A
7,119,297 B2   10/2006 Katagiri
7,189,932 B2 * 3/2007 Kim ............................ 200/5 R
7,268,312 B2 * 9/2007 Chen ........................... 200/343

FOREIGN PATENT DOCUMENTS

| CN | 1601677 A | 3/2005 |
| TW | 470948 B | 1/2002 |
| TW | 478639 Y | 3/2002 |
| TW | M248008 Y | 10/2004 |

* cited by examiner

*Primary Examiner*—Michael A Friedhofer
*Assistant Examiner*—Lheiren Mae A Caroc
(74) *Attorney, Agent, or Firm*—Wei Te Chung

(57) ABSTRACT

An exemplary flat panel display (2) includes a front housing part (20), which has a frame (21) having a button through hole (222) defined in a lower side thereof; a button (221) corresponding to the button through hole, the button comprising a pressing end (2215), at least one claw (2213), and a contact portion (2219), the at least one claw extending inward from an inner side of the button, and the contact portion extending inward from an inner side of the button at the pressing end; and an elastic arm (225) fixed at an inner surface of the lower side of the frame. The at least one claw of the button is snappingly engaged adjacent an inner surface of the lower side of the frame such that the button is engaged in the button through hole and slidable in the button through hole.

19 Claims, 9 Drawing Sheets

APPARATUS COMPRISING A BUTTON FORMED WITH A PANEL AND FLAT PANEL DISPLAY

CROSS-REFERENCE TO RELATED APPLICATION

This application is related to, and claims the benefit of, a foreign priority application filed in Taiwan as Serial No. 094144801 on Dec. 16, 2005. The related application is incorporated herein by reference.

FIELD OF THE INVENTION

The present invention relates to flat panel displays, and in particular to a flat panel display having a control button that can be configured to be low-profile.

BACKGROUND

Generally, a flat panel display has several function buttons on the front thereof, for controlling characteristics of images shown on a screen of the flat panel display such as luminance and contrast ratio.

FIG. 8 is an exploded, isometric view of a typical flat panel display. FIG. 9 is an assembled view of the flat panel display. The flat panel display 1 has a front housing part 12, a rear housing part (not shown), a display panel (not shown), a button module 155, and a button circuit board 13. The display panel is generally secured between and by the front housing part 12 and the rear housing part. The button circuit board 13 and the button module 155 are secured on the front housing part 12.

The front housing part 12 has a flange 15 at a lower section thereof. A plurality of button through holes 157 is provided in the flange 15 and a plurality of fixing portions 153 is provided at an inner surface 151 of the flange 15.

The button module 155 is sandwiched between the front housing part 12 and the button circuit board 13. The button module 155 has an elastic arm 1551 and several function buttons 1553, and a power button 1555. The elastic arm 1551 has a main body 1552, and a plurality of parallel connecting branches 1554 extending from the main body 1552. The main body 1552 has a plurality of fixing holes 1557, which correspond to the fixing portions 153. The function buttons 1553 and the power button 1555 are provided at the plurality of connecting branches 1554 respectively. Each button 1553, 1555 has a positioning end 1558 and a pressing end 1556 extend outward from the positioning end 1558. The pressing end 1556 is provided for a user to press and thereby input a corresponding controlling signal. The positioning end 1558 has a contacting piece 1560, which contacts the button circuit board 13 when the pressing end 1556 is pressed.

The function buttons 1553 and the power button 1555 are arranged in positions corresponding to the button through holes 157, and the pressing ends 1556 of the buttons 1553, 1555 penetrate through the button through holes 157 once the flat display panel 1 is assembled. In addition, because the positioning end 1558 is larger than the pressing end 1556, the function buttons 1553 and the power button 1555 cannot accidentally fall out through the button through holes 157. The button module 155 is electrically connected to a circuit board (not shown) of the display panel via a connecting wire (not shown). The user can control the display characteristics of the flat panel display 1 by operating the function buttons 1553.

To enable proper operation of the function buttons 1553 and the power button 1555 on the flange 15, the button through holes 157 are sized slightly larger than the corresponding pressing ends 156 of the function buttons 1553 and the power button 1555. In addition, for preventing the function buttons 1553 and the power button 1555 from sliding out too far through the button through holes 157, the positioning ends 1558 are sized larger than the corresponding button through holes 157. Further, the pressing ends 1556 of the buttons 1553, 1556 need to have a certain minimum size (including a minimum height) in order that they can be readily pushed by a user's finger. The button through hole 157 necessarily has to be bounded at top and bottom ends by portions of the flange 15 in order to keep the power button 1555 in position. This means that the flange 15 effectively has a certain minimum height that cannot be reduced. Similarly, the button module 115 needs the corresponding positioning ends 1558 in order to prevent the power button 1555 sliding out too far through the corresponding button through hole 157. This means that the flange 15 effectively has a certain minimum height that cannot be reduced.

Overall, the size of the flange 15 and the size of the button module 155 are necessarily restricted to certain large sizes, in order to accommodate the function buttons 1553 and the power button 1555. This means the flat panel display 1 is not as compact as some users might like it to be.

Accordingly, what is needed is a flat panel display that is compact.

SUMMARY

An exemplary flat panel display has a front housing part, which has a frame having a button through hole formed at a lower side of the frame; a button corresponding to the button through hole, which has a pressing end, a claw and a contact portion, the claw and the contact portion extending from an inner side of the pressing end along a same direction; and an elastic arm fixed at an inner surfer of the lower side of the frame. The claw of the button is inserted into the button through hole to fix the button on the frame of the front housing part, and the contact portion contacts the elastic arm through the button through hole.

Another exemplary flat panel display has a front housing part, which has a frame having a button through hole formed at a lower side of the frame; a button corresponding to the button through hole, which has a pressing end, a claw and a contact portion, the claw and the contact portion extending from an inner side of the pressing end along a same direction; and an elastic arm fixed at an inner surfer of the lower side of the frame. The claw of the button is inserted into the button through hole to fix the button on the frame of the front housing part, the pressing end and a tail end of the claw being respectively fixed at two sides of the button through hole, which limits the button at the frame, and the contact portion contacts the elastic arm through the button through hole.

A detailed description of various embodiments is provided below with reference to the accompanying drawings.

DETAILED DESCRIPTION OF EMBODIMENTS

Figure 1:
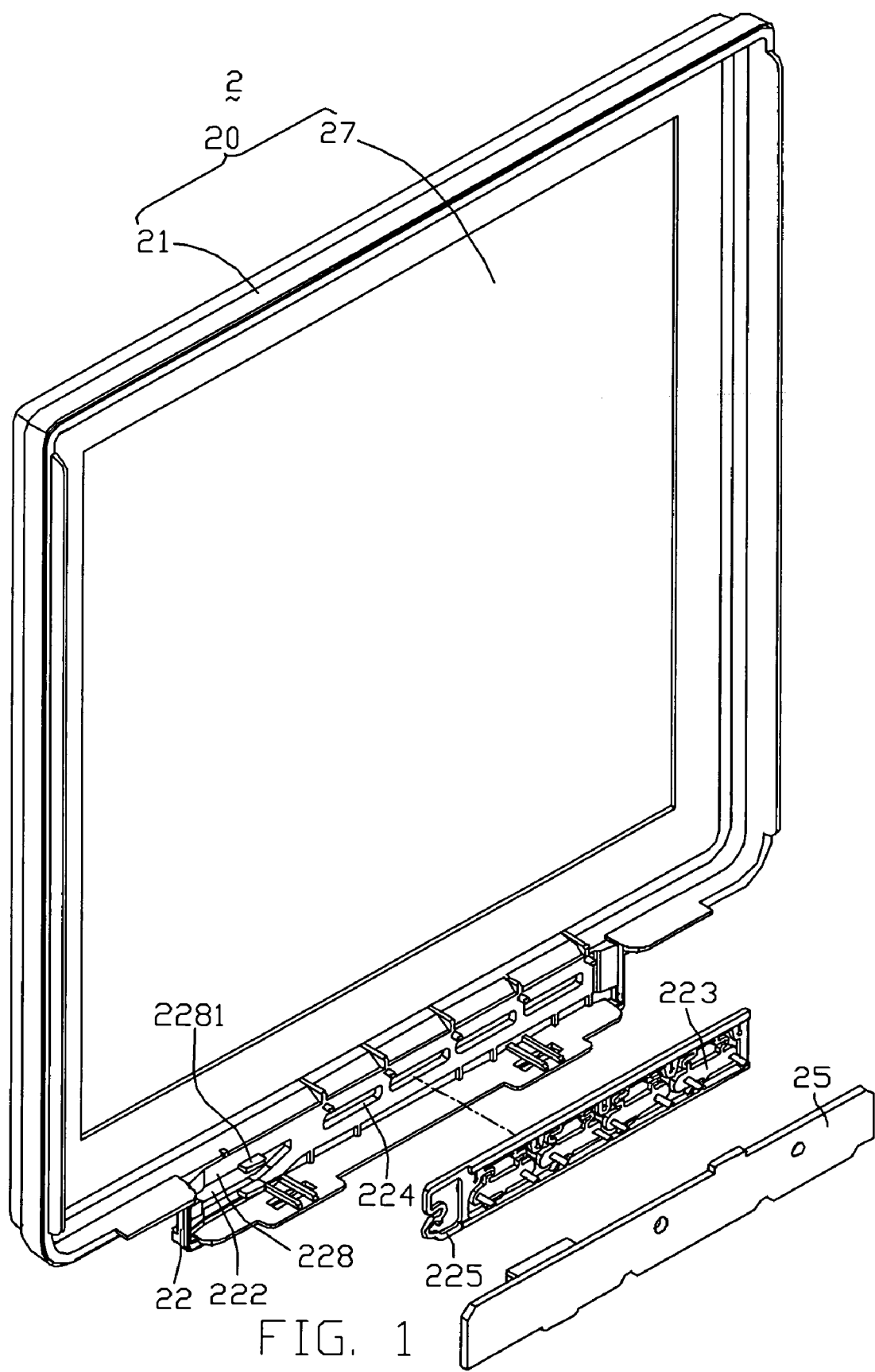
FIG. 1 is an exploded, isometric, rear view of a front housing part, a button module, and a button circuit board of a flat panel display in accordance with a first embodiment of the present invention.
Figure 2:
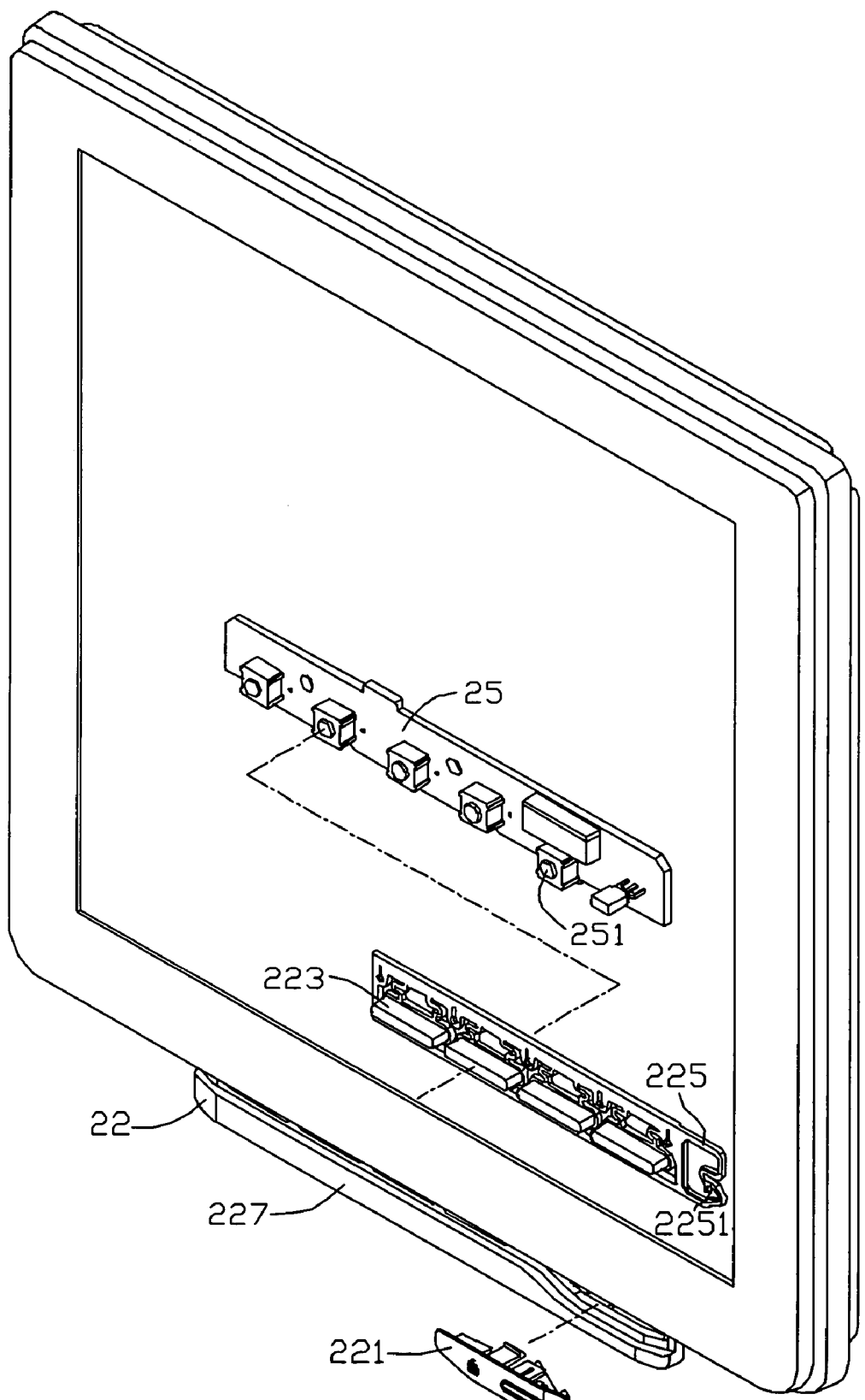
FIG. 2 is an exploded, isometric, front view of the front housing part, the button module, the button circuit board, and a power button of flat panel display of the first embodiment.
Figure 3:
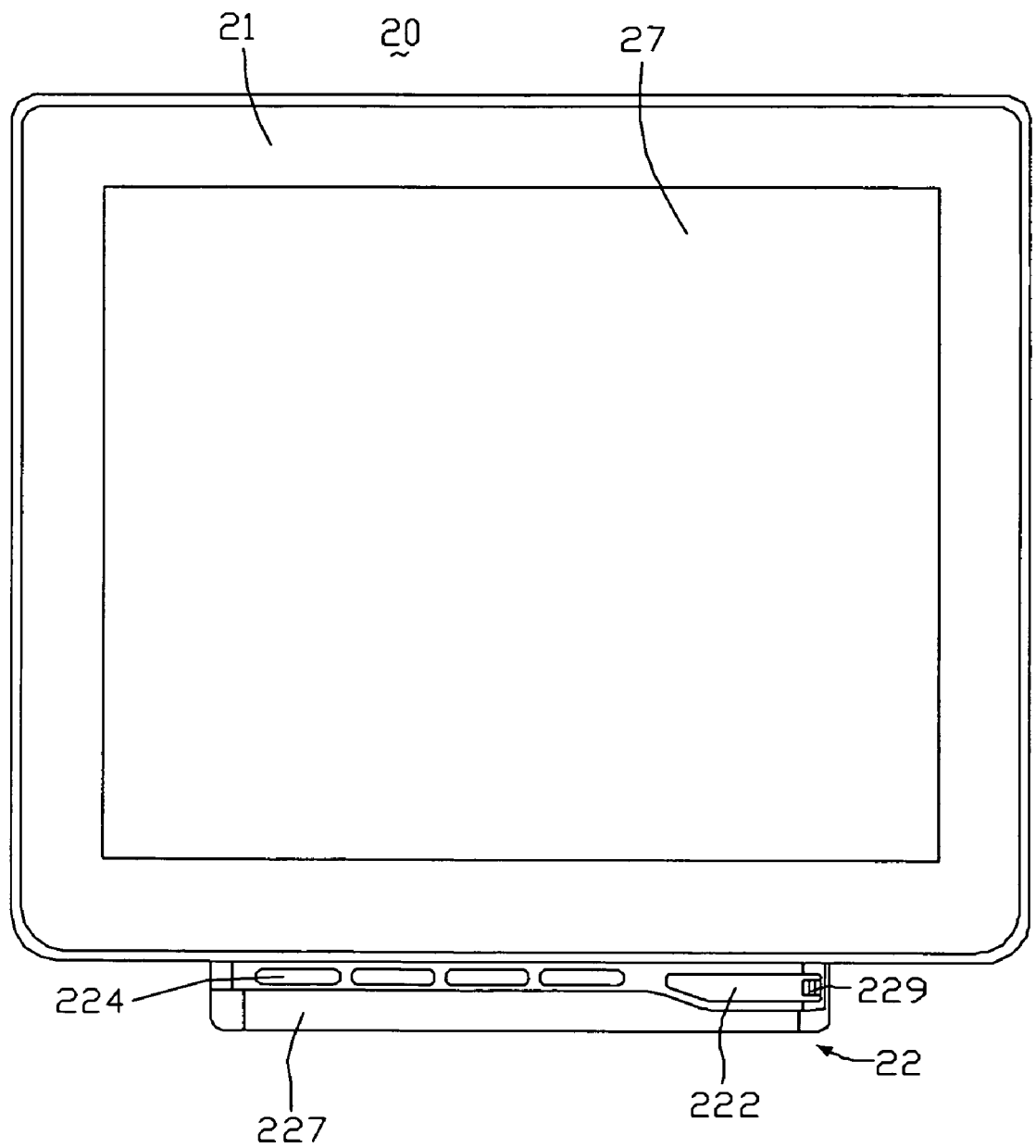
FIG. 3 is an assembled, front plan view of the components of the flat panel display shown in FIG. 2.

Referring to FIGS. 1-3, a flat panel display 2 in accordance with a first embodiment of the present invention includes a front housing part 20, a rear housing part (not shown), a display panel (not shown), a button module (not labeled), and a button circuit board 25 having a sensor 251 at one end thereof. The display panel is generally secured between and by the front housing part 20 and the rear housing part. The button circuit board 25 and the button module are secured on the front housing part 20.

The front housing part 20 includes a hollow frame 21 having an opening 27 corresponding to a display region of the display panel, and a flange 22 extending from a lower side of the hollow frame 21. A first button through hole 222, and a plurality of second button through holes 224 are defined in the flange 22. Two inner protrusions 2281 are provided at an inner surface 228 of the flange 22, above and below the first button through hole 222 respectively. An outer protrusion 229 is provided at an external surface 227 of the flange 22. The outer protrusion 229 has a detent portion 2291 formed therein. In the illustrated embodiment, the detent portion 2291 includes a vertical groove.

The button module is sandwiched between the front housing part 20 and the button circuit board 25. The button module has an elastic arm 225, and a plurality of function buttons 223 formed on the elastic arm 225. A separate power button 221 is also associated with the button module. The plurality of function buttons 223 correspond to the plurality of second button through holes 224, and the power button 221 corresponds to the first button through hole 222. The elastic arm 225 has a loop-shaped socket 2251 at one end thereof.

Figure 4:
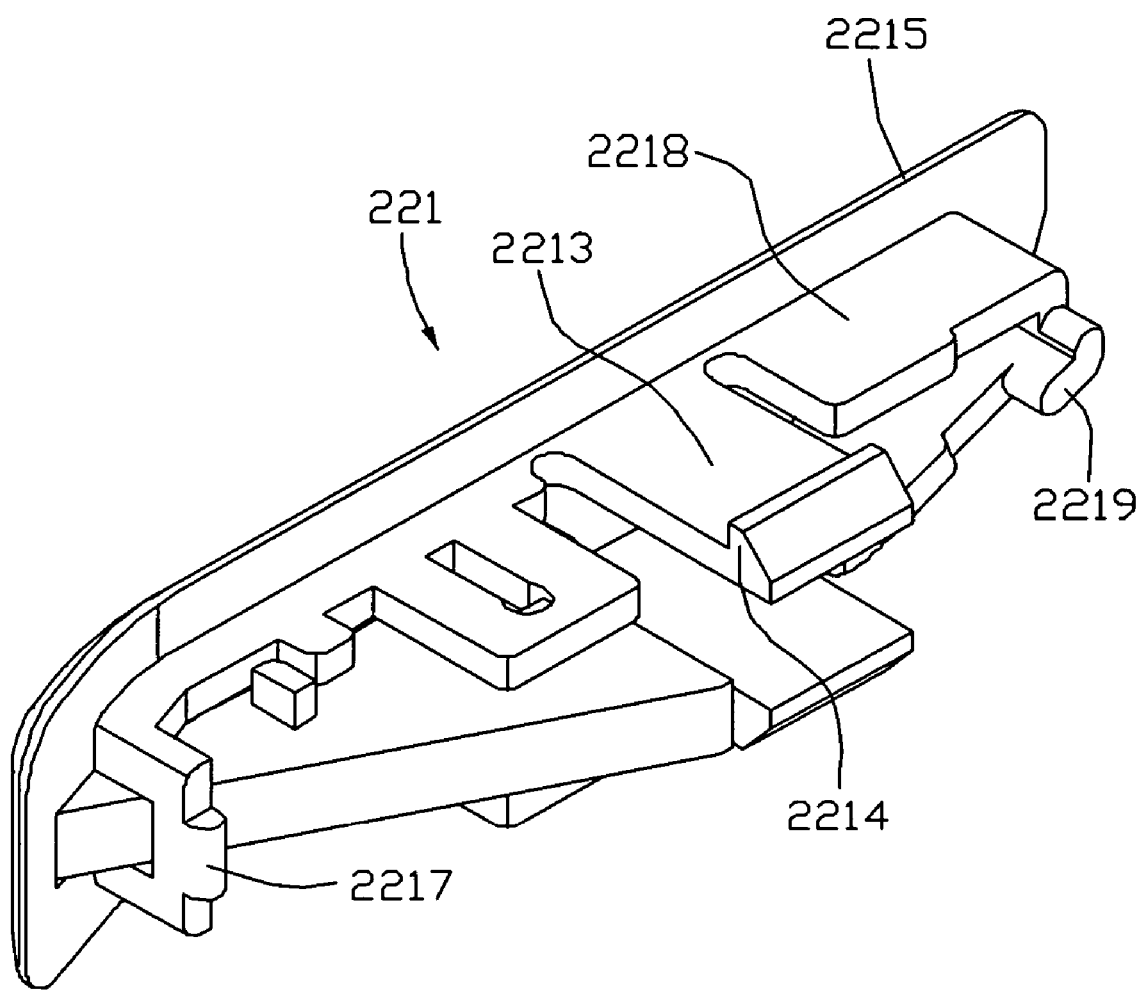
FIG. 4 is an enlarged, isometric, back view of the power button shown in FIG. 2.

Refersocket also to FIG. 4, the power button 221 has a pressing end 2215, two opposite claws 2213 extending from an inner side of a middle of the power button 221, a fixing portion 2217 at one side of the claws 2213, a connection part 2218 at another side of the claws 2213, and a contact portion 2219 extending inward from the connection part 2218 at the pressing end 2215. The two claws 2213 are disposed between the fixing portion 2217, the connection part 2218, and the two claws 2213, the fixing portion 2217, and the contact portion 2219 extend along a same direction. Each claw 2213 has a tab 2214. The contact portion 2219 corresponds to the socket 2251 of the elastic arm 225, and can penetrate through the socket 2251. The fixing portion 2217 corresponds to the outer protrusion 229, and is engaged in the detent portion 2291 of the outer protrusion 229.

Figure 5:
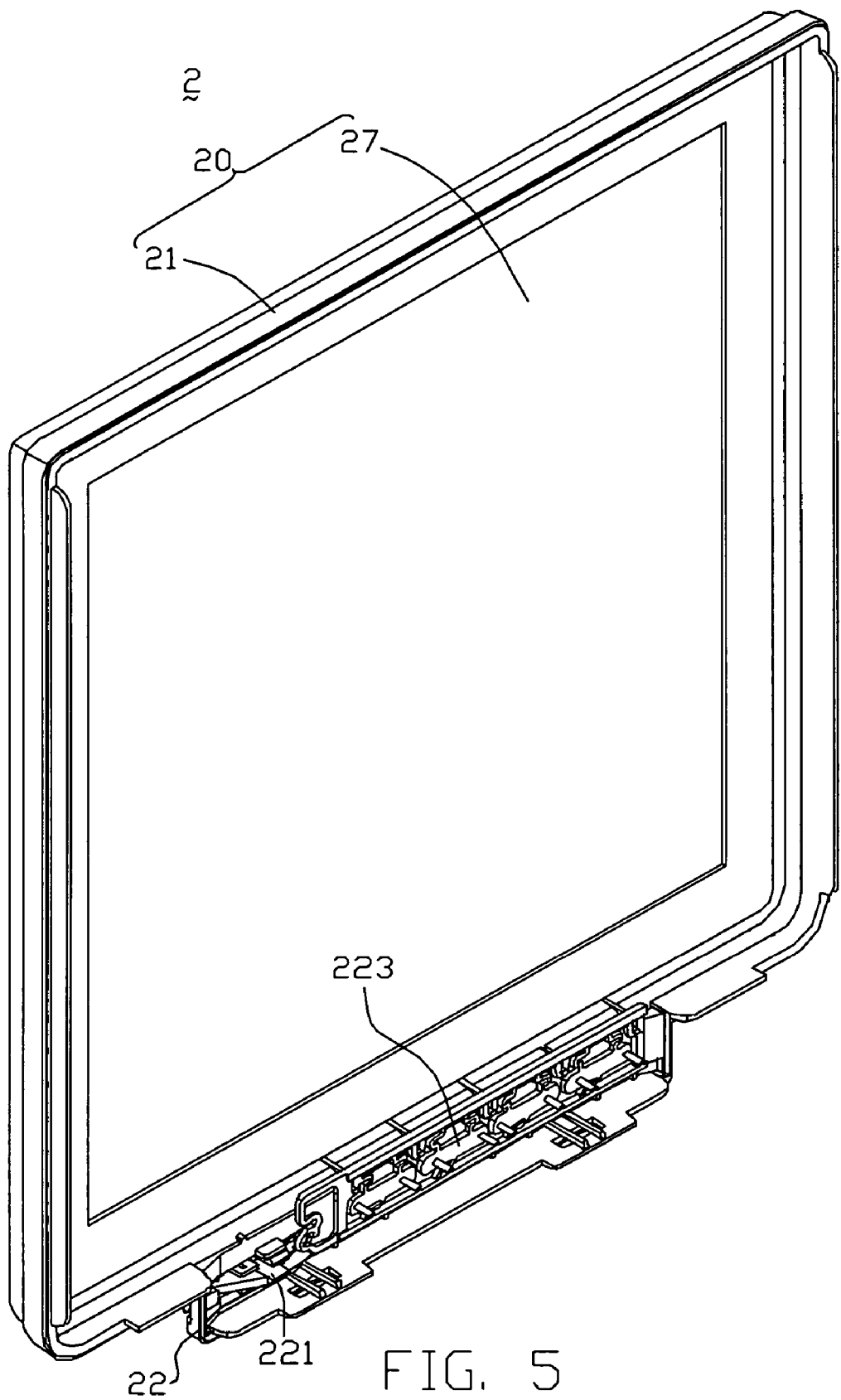
FIG. 5 is an assembled, isometric, back view of the components of the flat panel display shown in FIG. 2.
Figure 6:
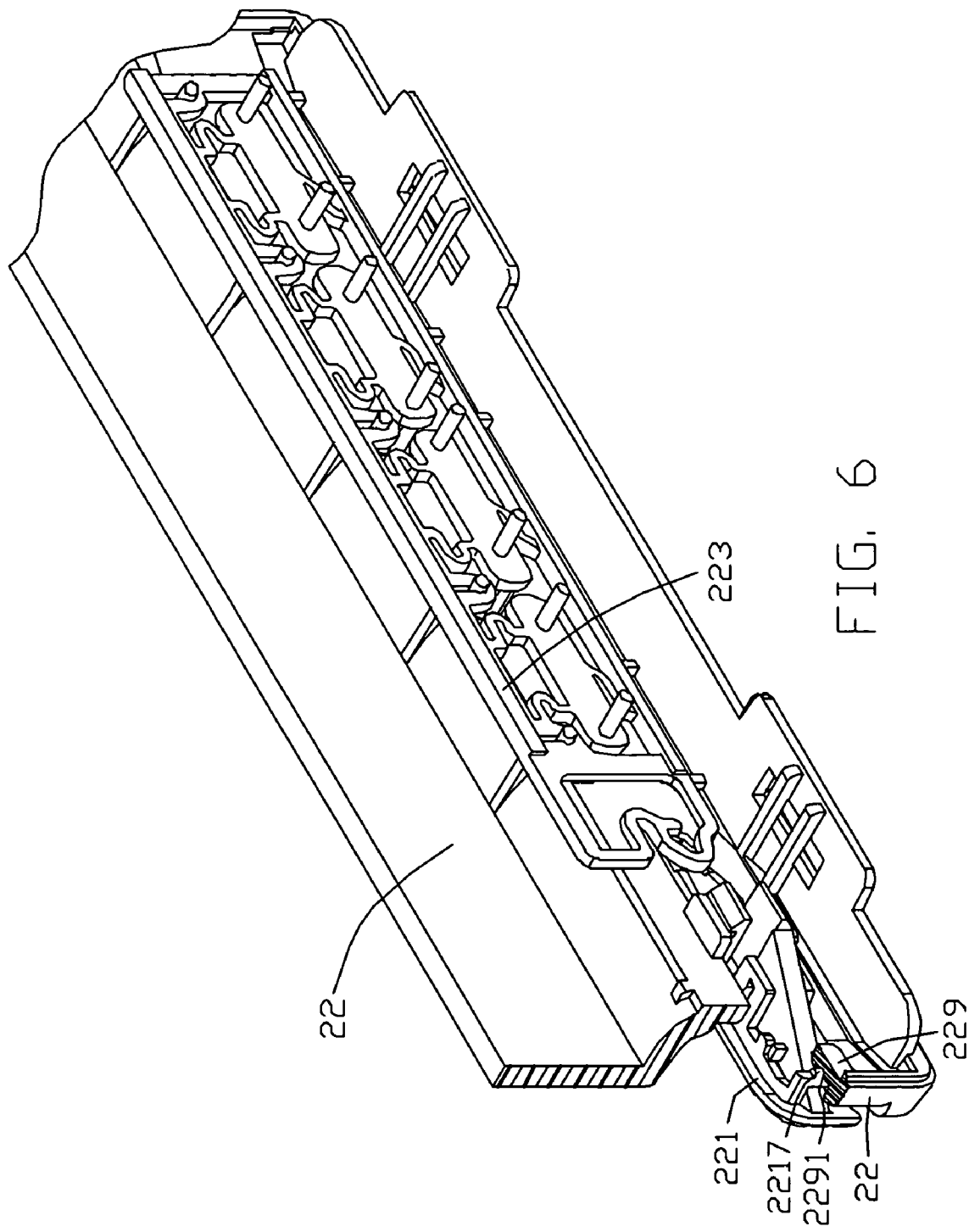
FIG. 6 is an enlarged, cutaway view of a bottom portion of the flat panel display assembly shown in FIG. 5.

Refersocket to FIG. 5 and FIG. 6, in assembly, the elastic arm 225 with the function buttons 223 is fixed on the inner surface 228 of the flange 22. The function buttons 223 are arranged in positions corresponding to the second button through holes 224, and penetrate through the second button through holes 224 once the flat display panel 2 is assembled. The socket 2251 of the elastic arm 225 corresponds to the first button through hole 222. When attaching the power button 221 in the first button through hole 222 of the flange 22, the two opposite claws 2213 are inserted into the first button through hole 222, and the two tabs 2214 of the two opposite claws 2213 resiliently snap into place behind the two inner protrusions 2281. At the same time, the contact portion 2219 penetrates through the socket 2251 of the elastic arm 225, and the fixing portion 2217 is fixed in the detent portion 2291 of the outer protrusion 229. Thus, the power button 221 is secured in the first button through hole 222, and can be pressed inward by a user. The button circuit board 25 is then attached to the inner surface 228 of the flange 22 by conventional means such as interengaging detents or screws. In this position, the sensor 2251 of the button circuit board 25 corresponds to the contact portion 2219 of the power button 221.

In operation, when the power button 221 is pressed, the contact portion 2219 contacts the sensor 251 of the button circuit board 25. The sensor 251 sends a controlling signal to supply power to the flat panel display 2. Thus, the flat panel display 2 can realize display of images. After the pressing force is withdrawn, the elastic arm 225 resiliently rebounds and returns the power button 221 to its original position.

Because the power button 221 is set at the outer surface 227 of the flange 22, the first button through hole 222 can be configured to have a size smaller than that of the power button 221, and the two opposite claws 2213 can be configured to match with a height of the first button through hole 222. That is, there is no need for the claws 2213 to span a total height greater than that of the power button 221. Thus, even though the power button 221 may need to span a certain minimum height in order that it can be readily pushed by the user's finger, the corresponding minimum height required of the flange 22 need be no greater than the height of the power button 221. This minimum height of the flange 22 is less than the minimum height required of the flange 15 of the above-described conventional flat panel display 1, because the button through hole 157 necessarily has to be bounded at top and bottom ends by portions of the flange 15 in order to keep the power button 1555 in position. For similar reasons, the button module including the elastic arm 225 need only have a height no greater than the height of the power button 221. This height of the button module is less than the minimum height required of the button module 115 of the conventional flat panel display 1, because the button module 115 needs the corresponding positioning end 1558 in order to prevent the power button 1555 from sliding out too far through the corresponding button through hole 157.

Overall, the power button 221 and button module can occupy less space compared to the conventional power button 1555 and button module 115. This enables the flat panel display 2 to be made smaller and be more easily handled, saves on the cost of materials, and provides the flat panel display 2 with a sleek, attractive low-profile appearance.

In an alternative embodiments, the function buttons 223 also can be configured to have structures similar to that of the power button 221.

Figure 7:
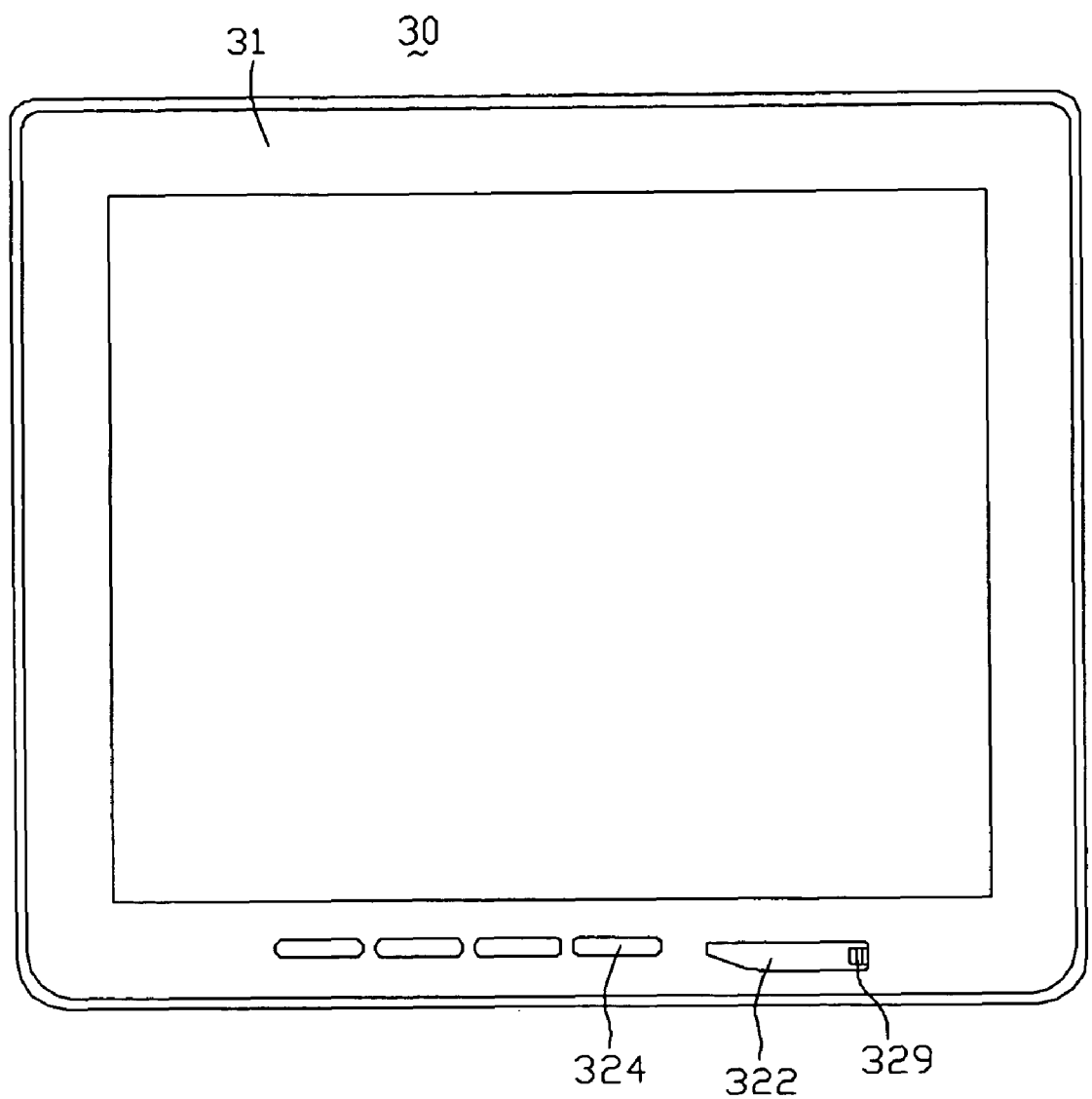
FIG. 7 is a front plan view of a front housing part of a flat panel display in accordance with a second embodiment of the present invention.
Figure 8:
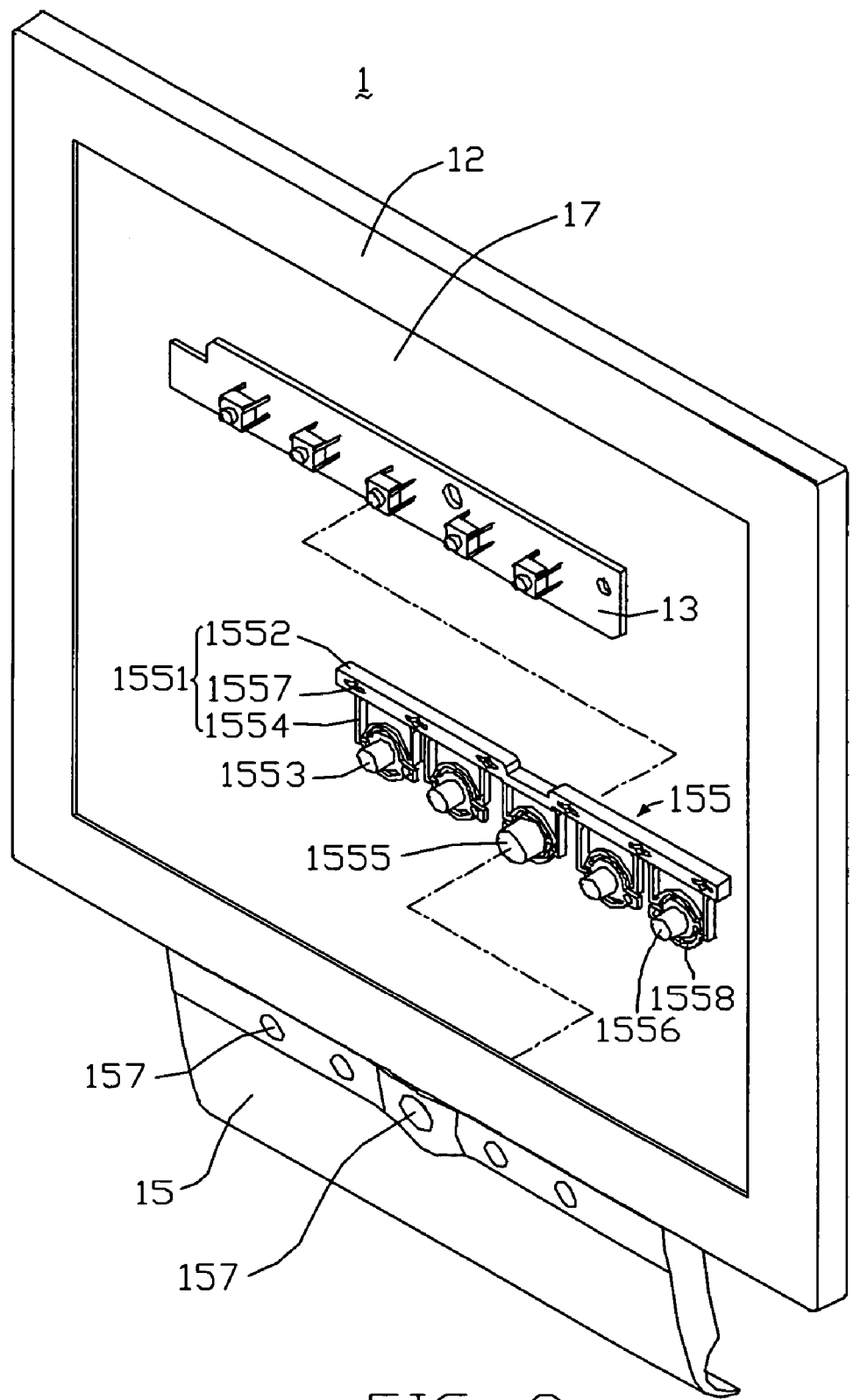
FIG. 8 is an exploded, isometric, front view of a front housing part, a button module, and a button circuit board of a conventional flat panel display.
Figure 9:
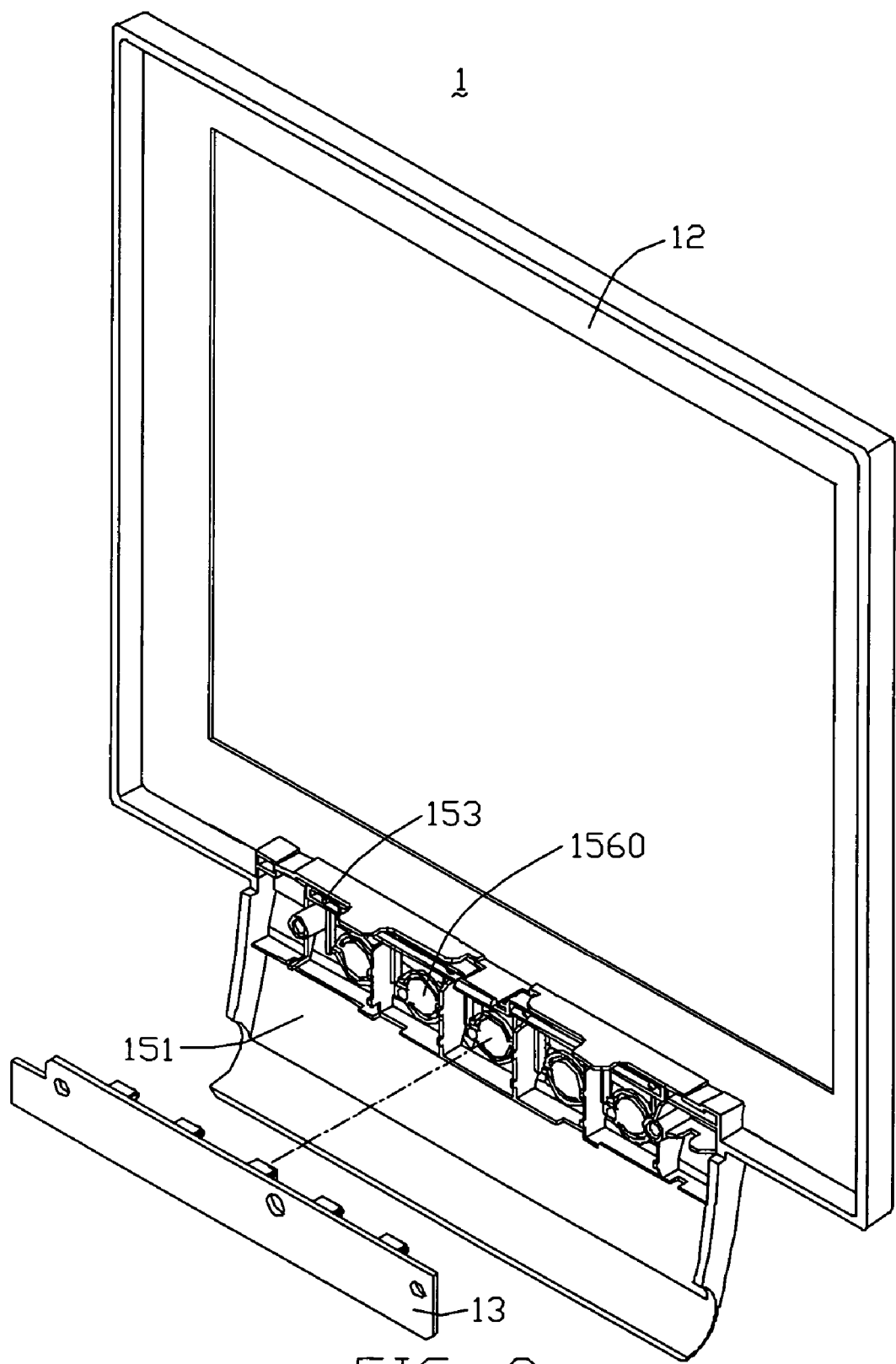
FIG. 9 is a partly assembled, isometric, back view of the front housing part, the button module, and the button circuit board of the flat panel display shown in FIG. 8.

Refersocket to FIG. 7, a front housing part 30 of a flat panel display in accordance with a second embodiment of the present invention is shown. The front housing part 30 has a same structure similar to that of the above-described front housing part 20, except that the front housing part 30 does not have a flange. A first button through hole 322, a plurality of second button through holes 324, two inner protrusions (not visible), and an external protrusion 329 are formed at a lower side (not labeled) of a frame 31 of the front housing part 30.

While preferred and exemplary embodiments have been described above, it is to be understood that the invention is not limited thereto. To the contrary, the above description is intended to also cover various modifications and similar arrangements as would be apparent to those skilled in the art. Therefore, the scope of the appended claims should be accorded the broadest interpretation so as to encompass all such modifications and similar arrangements.

What is claimed is:

1. A flat panel display, comprising:
   a front housing part, which comprises a frame having a button through hole defined in a lower side thereof;
   a button corresponding to the button through hole, the button comprising a pressing end, at least one claw, a contact portion, and a fixing portion at an end of the button opposite from the pressing end, the at least one claw extending inward from an inner side of the button, the contact portion extending inward from an inner side of the button at the pressing end, the at least one claw disposed between the fixing portion and the contact portion, and the fixing portion pivotably engaged with the lower side of the frame; and
   an elastic arm fixed at an inner surface of the lower side of the frame;
   wherein the at least one claw of the button is snappingly engaged adjacent an inner surface of the lower side of the frame such that the button is engaged in the button through hole and slidable in the button through hole, and the contact portion is engaged with the elastic arm, and when the pressing end of the button is pushed inward from a starting position and then released, the elastic arm resiliently drives the button back to the starting position.

2. The flat panel display as claimed in claim 1, wherein the contact portion is engaged in the elastic arm.

3. The flat panel display as claimed in claim 1, wherein the lower side of the frame comprises an outer protrusion, which engages with the fixing portion of the button.

4. The flat panel display as claimed in claim 3, wherein the outer protrusion comprises a detent portion.

5. The flat panel display as claimed in claim 1, wherein the at least one claw is two claws, which are oriented symmetrically opposite each other.

6. The flat panel display as claimed in claim 1, wherein the button is a power button.

7. The flat panel display as claimed in claim 1, wherein the frame further comprises at least one inner protrusion, and the at least one claw is snappingly engaged adjacent an inner end of the at least one inner protrusion.

8. The flat panel display as claimed in claim 1, wherein the elastic arm comprises a socket, and the contact portion is engaged through the socket.

9. The flat panel display as claimed in claim 1, wherein the frame comprises a flange, and the button through hole is defined in the flange.

10. A flat panel display, comprising:
    a front housing part, which comprises a frame having a button through hole defined in a lower side thereof;
    a button comprising a pressing end, at least one claw, a contact portion, a pivot end opposite to the pressing end, and a fixing portion at an end of the button opposite from the pressing end, the at least one claw extending inward from an inner side of the button between the pressing end and the pivot end, the contact portion extending inward from an inner side of the button at the pressing end, the at least one claw disposed between the fixing portion and the contact portion, and the fixing portion pivotably engaged with the lower side of the frame; and
    an elastic arm fixed at an inner surface of the lower side of the frame;
    wherein the at least one claw of the button is snappingly engaged adjacent an inner surface of the lower side of the frame such that the button is engaged in the button through hole and slidable in the button through hole, and the contact portion is engaged with the elastic arm; and
    when the pressing end of the button is pushed inward from a starting position, the button pivots about the pivot end thereof and the at least one claw slides rearward in the button through hole, and when the pressing end of the button is released, the elastic arm resiliently drives the button forward, the inner surface of the frame blocks the at least one claw, and the button is thereby returned to the starting position.

11. The flat panel display as claimed in claim 10, wherein the contact portion is engaged in the elastic arm.

12. The flat panel display as claimed in claim 10, wherein the lower side of the frame comprises an outer protrusion, which engages with the fixing portion of the button.

13. The flat panel display as claimed in claim 12, wherein the outer protrusion comprises a detent portion.

14. The flat panel display as claimed in claim 10, wherein the at least one claw is two claws, which are oriented symmetrically opposite each other.

15. The flat panel display as claimed in claim 10, wherein the button is a power button.

16. The flat panel display as claimed in claim 10, wherein the frame further comprises at least one inner protrusion, and the at least one claw is snappingly engaged adjacent an inner end of the at least one inner protrusion.

17. The flat panel display as claimed in claim 10, wherein the elastic arm comprises a socket, and the contact portion is engaged through the socket.

18. The flat panel display as claimed in claim 10, wherein the frame comprises a flange, and the button through hole is defined in the flange.

19. An apparatus, comprising:
    a panel comprising an outer surface, an inner surface, and a button through hole defined in an edge of the panel, the button through hole extending from the outer surface to the inner surface;
    an elastic member fixed at the inner surface of the panel; and
    a button attached to the panel and corresponding to the button through hole, the button comprising a pressing portion at an outer side of the button, at least one claw extending inward from an inner side of the button, a contact portion extending inward from the inner side of the button at the pressing portion, and a fixing portion at an end of the button opposite from the pressing portion, the at least one claw disposed between the fixing portion and the contact portion, and the fixing portion pivotably engaged with the edge of the panel;
    wherein the at least one claw of the button is snappingly engaged adjacent an inner surface of the edge of the panel such that the button is engaged in the button through hole and movable in the button through hole, the button is engaged with the elastic member, and when the pressing end of the button is pushed inward from a starting position and then released, the elastic member resiliently drives the button back to the starting position.

* * * * *